(12) United States Patent
Tomofuji et al.

(10) Patent No.: US 7,062,173 B2
(45) Date of Patent: Jun. 13, 2006

(54) OPTICAL DEVICE AND WAVELENGTH DIVISION MULTIPLEXING COMMUNICATION SYSTEM USING SAME

(75) Inventors: Hiroaki Tomofuji, Kawasaki (JP); Toru Katagiri, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 740 days.

(21) Appl. No.: 09/963,471

(22) Filed: Sep. 27, 2001

(65) Prior Publication Data

US 2002/0149818 A1  Oct. 17, 2002

(30) Foreign Application Priority Data

Mar. 15, 2001  (JP) ............... 2001-074857

(51) Int. Cl.
*H04J 14/02* (2006.01)
(52) U.S. Cl. .......................... 398/82; 398/81
(58) Field of Classification Search ................ 398/79, 398/81–82
See application file for complete search history.

(56) References Cited

U.S. PATENT DOCUMENTS

| | | | |
|---|---|---|---|
| 6,263,126 B1 * | 7/2001 | Cao | 385/24 |
| 6,377,375 B1 * | 4/2002 | Taga et al. | 398/92 |
| 6,459,515 B1 * | 10/2002 | Bergano | 398/79 |
| 6,545,783 B1 * | 4/2003 | Wu et al. | 398/83 |

FOREIGN PATENT DOCUMENTS

| | | |
|---|---|---|
| JP | 7-212347 | 8/1995 |
| JP | 9-326759 | 12/1997 |
| JP | 10-145298 | 5/1998 |
| JP | 10-164019 | 6/1998 |
| JP | 10-242943 | 9/1998 |
| JP | 11-88263 | 3/1999 |
| JP | 11-109174 | 4/1999 |
| JP | 11-204866 | 7/1999 |
| JP | 11-215058 | 8/1999 |

* cited by examiner

*Primary Examiner*—Leslie Pascal
(74) *Attorney, Agent, or Firm*—Staas & Halsey LLP

(57) ABSTRACT

An optical device can realize a further severer wave synthesizing/separation characteristic, compared with the characteristic in the past. The optical device includes a branching filter which separates wavelength division multiplexed signal lights of a plurality of wavelength groups, into first wavelength groups and second wavelength groups consisting of wavelength groups which do not come into contact with the wavelength groups making up the first wavelength groups, on the wavelength axis; a functional circuit that functionally processes the wavelength groups on a wavelength group-by-group basis of the separated first wavelength groups and second wavelength groups; and a multiplexer connected to the branching filter through the functional circuit, for synthesizing the separated first wavelength groups and second wavelength groups.

18 Claims, 15 Drawing Sheets

(4, 2)Filter: 32 λ

(8, 4)Filter: 32 λ

(4, 2)(8, 4)Filters: 36 λ

OPTICAL DEVICE AND WAVELENGTH DIVISION MULTIPLEXING COMMUNICATION SYSTEM USING SAME

BACKGROUND OF THE INVENTION

1. Field of the Invention

The present invention relates to an optical device and a wavelength division multiplexing communication system using the same.

2. Description of the Related Arts

Recently, with the widespread use of internet and image transmission, the development and introduction of a wavelength division multiplexing (WDM) optical communication are being pushed ahead to meet the explosive growth of communication demand. Especially, as to the WDM system, further larger capacity transmission is being pursued by means of enlarging the number of wavelengths and improving the transmission rate per wave, and additional studies are being made to realize super long distance transmission for somewhere around 2000 km, without the need to insert an expensive regenerative repeater with 3R (receive/regenerate/relay functions).

In transmitting such a super long distance, problems could be the accumulation of channel wavelength-to-wavelength level deviation and the accumulation of channel-to-channel wavelength dispersion deviation.

In addition, channel wavelength-to-wavelength level deviation will be generated by the gain deviation of the optical amplifier for WDM, as well as non-linear effects including the Raman effect scattering (SRS: Stimulated Raman Effect Scattering) which causes amplification effect to the signal on the longer wavelength side, with the optical signal on the shorter wavelength side becoming a pumping light.

For this reason, in the channel signal where the level becomes lower, the optical SNR (signal-to-noise ratio) will be degraded. Due to the degraded ratio, the transmission distance has to be limited.

In the high-speed transmission system, the management of dispersion amount will be additionally important. As the optical receiver has an allowable capacity for wavelength dispersion, the amount of dispersion should necessarily be controlled to 1000 ps/nm maximum, when the speed is 10 Gb/s.

On the other hand, dispersion compensation is totally carried out by inserting a dispersion compensation fiber (DCF) into each in-line amplifier to compensate for the dispersion coefficient of the transmission path fiber which intrinsically exists, depending on the types of transmission path fiber. Moreover, as the dispersion coefficient of the transmission path fiber has a slope to the wavelength, the design is made so that the dispersion deviation at each wavelength is compensated, allowing the dispersion compensation fiber to have an inverted slope.

However, for the NZ-DSF (Non Zero-Dispersion Shift Fiber) currently being used, it is difficult to perfectly compensate up to the dispersion slope with the use of the dispersion compensation fiber. Due to this difficulty, as long distance transmission is being in progress, each wavelength-to-wavelength dispersion deviation will be increased, so the deviation could exceed the allowable dispersion capacity of the optical receiver.

Therefore, to solve the accumulation problem of such level deviation and dispersion slope deviation, studies are being made to place a compensation node at every several spans. FIG. 1 shows a configuration example of an optical multiplexing transmission system with compensation nodes.

In the basic line-based optical communication system, an example of which is shown in FIG. 1, the terminal station A and the terminal station B are connected with a super long distance optical transmission path, about 1,500 km long. Assuming that signals are to be transmitted from the terminal station A to the terminal station B, at the terminal station A, optical signals, each having different wavelength will be inputted by the optical transmitter 100. Then, the optical signals with two or more wavelengths will be wavelength multiplexed with the optical multiplexer 101 and sent out to the transmission path fiber 102.

To the transmission path fiber 102, the optical amplifier 103 will be inserted to maintain the optical signal level, at established distances, for instance, 80 to 100 km as one span. Moreover, the compensation node 104 will be inserted at intervals of several spans. On the compensation node 104, to solve the accumulation problem of the level deviation and dispersion slope deviation, an optical branching filter will be provided as an optical device to make level adjustment and dispersion compensation for each accumulation.

While at the terminal station B, the optical branching filter 105 will be provided. With this optical branching filter 105, the wavelength multiplexed optical signals sent through the optical transmission path fiber 102 will be separated on a wavelength-by-wavelength basis, and will be inputted to the applicable optical signal receiver 106 to regenerate signals.

FIG. 2 shows a configuration example of an optical multiplexer/branching filter as an optical device to be placed on the compensation node 104. The optical multiplexer/branching filter illustrated here has the component elements including the optical branching filter 1, optical attenuator 2 for level adjustment to be provided for every wavelength group, dispersion compensation fiber 3 and optical multiplexer 4.

On the optical branching filter 1, the input wavelength multiplexed optical signals will be once separated for each wavelength group. Then, with the optical attenuator 2, the optical signal level will be adjusted according to each wavelength group, and with the dispersion compensation fiber 3, the dispersion deviation will be adjusted, so as to allow the optical multiplexer 4 to synthesize signals again.

Here, the reason why optical signals will be separated or synthesized not on an individual wavelength-by-wavelength basis, but on a wavelength group-by-group basis is to reduce the quantity and size required for the optical attenuator 2 and dispersion compensator 3.

FIG. 3 illustrates wavelength groups. Individual wavelengths of two or more optical signals to be wavelength multiplexed are allocated on the wavelength axis. As illustrated, in order to separate and synthesize optical signals on a wavelength group-by-group basis, such as G1, G2, G3 and so on, the optical branching filter 1 is required to have a filter characteristic with a rectangular cutoff characteristic.

However, it is difficult to actually configure a filter having such a rectangular cutoff characteristic. Due to this difficulty, a guard band GB is provided to eliminate the need to place any optical signal at the grouped wavelength-to-wavelength. On an example illustrated in FIG. 3, the area for three wavelengths is considered a guard band GB area where any optical signal is not placed at the grouped wavelength-to-wavelength.

In addition, FIG. 4 shows the configuration of an optical multiplexer/branching filter, when add/drop of optical signals will be made with the compensation node 104. In FIG. 4, in order to make the optical signal add/drop function feasible, after separating optical signals on a wavelength group-by-group basis with the optical branching filter 1, add the branching filter 5 to further separate optical signals on a wavelength-by-wavelength basis.

It is also possible to add the multiplexers 6 and 7 and synthesize the inserted optical signals on a wavelength-by-wavelength basis, before synthesizing each wavelength group with the optical multiplexer 4.

Here, for the wave synthesizing/separation filter to be used on the optical branching filter 1 and optical multiplexer 4 for the optical multiplexer/branching filter on the compensation node 104, requirements are to ensure isolation with other ports and low loss characteristic.

Generally, the wave synthesizing/separation filter is actually configured with the multistage combination of the dielectric multilayer film filter 10 as illustrated in FIG. 5A. The dielectric multilayer film filter 10 utilizes the interference effect of the dielectric thin films alternately piled up on the circuit board. As for the band pass filter type as illustrated in FIG. 5A, against the incident port (1) for lights, this type has the transmission port (2) which outputs the specified wavelength light allowing it to pass through, and the reflection port (3) which cuts off and reflects wavelength lights other than the specified wavelength light.

Therefore, in FIG. 6 showing the transmission characteristic of the dielectric multilayer film filter, the components of the specified wavelength 1 of the optical signal to come in the incident port (1) will be outputted to the transmission port (2), and the components of other wavelengths than the specified wavelength 1 will be reflected and outputted from the reflection port (3).

FIG. 7 shows the conventional optical multiplexer/branching filter, as an optical device consisting of the multistage combination of the dielectric multilayer film filter 10 as illustrated in FIG. 5.

In FIG. 7, to provide functions as the compensation node 104, the optical attenuator 2 and dispersion compensation fiber 3 are provided between the optical branching filter 1 and optical multiplexer 4, and it is possible to obtain an optical device, the usage of which is not limited to the compensation node 104, by changing of the functional element to be provided between the optical branching filter 1 and optical multiplexer 4. The same applies to the following case.

In FIG. 7, the dielectric multilayer film filters 10-1 through 10-5, components of the optical branching filter 1, are sequentially connected in series, so that the reflected light (3) of the reflection port for the dielectric multilayer film filter comes in its incident port (1).

From the transmission port (3) for the dielectric multilayer film filters 10-1 through 10-5, the individual wavelength groups G1 through G5 will be allowed to pass through and will be outputted.

Moreover, the optical multiplexer 4 similarly consists of the dielectric multilayer film filters 10-6 through 10-10, and each dielectric multilayer film filter has three I/O ports, (1)', (2)' and (3)', as illustrated in FIG. 5B, and its I/O characteristic is the reverse characteristic of the dielectric multilayer film filters 10-1 through 10-5 illustrated in FIG. 5A.

Therefore, the ports (1)', (2)' and (3)' illustrated in FIG. 5B correspond to the ports (1), (2) and (3) illustrated in FIG. 5A, respectively.

Because of the reversible I/O characteristic, to the input port (2)' on one side, the transmitted light to be outputted from the transmission port (3) applicable to the dielectric multilayer film filters 10-1 through 10-5 for the optical branching filter 1 will be inputted, and the transmitted light to be inputted will be directly outputted to the output port (3)'. In addition, the dielectric multilayer film filters 10-6 through 10-10 are sequentially connected in series, so that the output of the output port (3)' for the dielectric multilayer film filter will be inputted to the input port (1)' on the other side.

The light to be inputted to the input port (1)' on the other side, will be reflected and outputted to the output port (3)'. Therefore, the optical signals of the wavelength groups G1 through G5 already separated by the optical branching filter 1 will be sequentially wavelength multiplexed with the dielectric multilayer film filters 10-6 through 10-10 for the optical multiplexer 4 and will be outputted.

Here, as the transmission rate is increasing, the flatness within the band of the multilayer film filter becomes important. If the flatness is not kept, waveform distortion may be caused, and the distortion can be accumulated by multistage transmission through the compensation node with the optical multiplexer/branching filter, thereby allowing the signal receiving characteristic to be deteriorated.

While, to the adjacent wavelength groups, the filter is required to ensure high isolation characteristic of 20 through 30 dB. If the amount of isolation is not sufficiently secured, the same signal may be synthesized by the output of the multiplexer 4, via different ports, and can be the components of coherent cross-talk. This could give interference noise to signals.

Therefore, in order to secure high isolation, the filter is required to secure a steep cutoff characteristic. However, as the characteristic of the dielectric multilayer film filter, a steep filter characteristic is hard to be compatible with a flat band characteristic. For this reason, it is necessary to provide a wide guard band GB where any signal is not placed at each wavelength group-to-group.

Here, define the method of grouping wavelengths as illustrated in FIG. 3, and represent the number of live channels within one group by m, and use n to represent the number of dead channels to be placed within the guard band GB at group-to-group, so that the relation is expressed by (m, n) as the band use efficiency, and finally find out the result, which found out to be (5, 3) in an example as shown in FIG. 3.

Accordingly, in case where the dielectric multilayer film filter is used, and the relation of the band use efficiency (m, n) is (6,3) or (5,3), the band use efficiency (=signal band width per one group/periodic wavelength intervals of grouped wavelength) will be about 60%, thereby highlighting the future problem to improve the band use efficiency compared with the system which does not need any dispersion compensation.

Moreover, as a pre-condition, the range in which the number of wavelengths that can be amplified will be restricted because of the band characteristic of the amplifier. Therefore, the more the number of dead channels to be placed within the guard band GB at the group-to-group increases, the fewer the number of effective wavelengths subject to amplification within the band characteristic of the amplifier could decrease.

SUMMARY OF THE INVENTION

From such a point, the object of the invention is to provide an optical device and a wavelength division multiplexing transmission system using the same, that enables the band use efficiency to be improved by means of increasing the proportion of the signal band width per group.

In order to achieve the above object, according to a first aspect of the present invention there is provided an optical device comprising a first branching filter to input wavelength division multiplexed signal lights and separate the signal lights into a first wavelength band and other wavelength bands; a second branching filter to input lights separated into the other wavelength bands by the first branching filter, and separate the lights into a second wavelength band different from the first wavelength band and other wavelength bands; and a second wavelength device to input the lights of the second wavelength band extracted by the second branching filter, the second wavelength device outputting at least the second wavelength band to the first multiplexer, wherein the first multiplexer synthesizes lights separated into the first wavelength band by the first branching filter and the lights from the second multiplexer and outputs the synthesized lights.

To achieve the above object, the optical device may further comprise a third branching filter to separate lights, at least, into a wavelength band lying between the first and second wavelength bands and other bands; and a third multiplexer to input the lights of the wavelength band lying between the first and second wavelength bands separated by the third branching filter, the third multiplexer outputting at least the lights of the wavelength band between the first and the second wavelength bands to the second multiplexer, wherein the second multiplexer synthesizes the lights of the second wavelength band from the second branching filter and the lights from the third multiplexer, and outputs the synthesized lights to the first multiplexer.

In order to achieve the above object, according to a second aspect of the present invention there is provided an optical device having an optical branching filter to separate the wavelength division multiplexed signal lights on a wavelength group-by-group basis, and an optical multiplexer functionally connected to the branching filter, for synthesizing the signal lights which have been separated on a wavelength group-by-group basis, wherein the optical branching filter comprises a first branching filter that sequentially separates the wavelength division multiplexed signal lights of even numbered or odd numbered wavelength groups on a wavelength group-by-group basis; and a second branching filter that sequentially separates the wavelength division multiplexed signal lights of the odd numbered or even numbered wavelength groups corresponding to the remaining signal lights of the signal lights separated by the first branching filter, on a wavelength group-by-group basis, and wherein the optical multiplexer comprises a first multiplexer that sequentially synthesizes the signal lights of the odd numbered or even numbered wavelength groups separated by the second branching filter; and a second multiplexer that sequentially synthesizes the signal lights of the even numbered or odd numbered wavelength groups separated by the first branching filter.

In order to attain the above object, according to a third aspect of the present invention there is provided an optical device having an optical branching filter to separate the wavelength division multiplexed signal lights on a wavelength group-by-group basis, and an optical multiplexer functionally connected to the branching filter, for synthesizing the signal lights which have been separated on a wavelength group-by-group basis, wherein the optical branching filter comprises a first branching filter that separates signal lights into the wavelength division multiplexed signal lights of the odd numbered wavelength groups and the signal lights of the even numbered wavelength groups; and a second branching filter that separates the signal lights of the odd numbered and even numbered wavelength groups separated by the first branching filter, into respective wavelength groups, and wherein the optical multiplexer comprises a first multiplexer that synthesizes the signal lights separated into the respective wavelength groups by the second branching filter, into the even numbered wavelength groups and the odd numbered wavelength groups, respectively; and a second multiplexer that synthesizes the signal lights of the even numbered wavelength groups and the signal lights of the odd numbered wavelength groups synthesized by the first multiplexer.

In order to attain the above object, according to a fourth aspect of the present invention there is provided a wavelength division multiplexing communication system having a compensation node in the middle of the transmission path optical fiber to transmit wavelength division multiplexed optical signals, wherein the compensation node comprises an optical device, the optical device having an optical branching filter to separate the wavelength division multiplexed signal lights on a wavelength group-by-group basis, having a function unit to make level adjustment and wavelength dispersion compensation for the optical signals of wavelength groups to be separated by the optical branching filter, and having an optical multiplexer to synthesize the signal lights that have been level adjusted and dispersion compensated by the function unit and separated on a wavelength group-by-group basis, and wherein the optical branching filter includes a first branching filter to sequentially separate the wavelength division multiplexed signal lights of the even numbered or odd numbered wavelength groups on a wavelength group-by-group basis, and a second branching filter to sequentially separate the wavelength division multiplexed signal lights of the odd numbered or even numbered wavelength groups corresponding to the remaining signal lights of the signal lights separated by the branching filter, on a wavelength group-by-group basis, and wherein the optical multiplexer includes a first multiplexer to sequentially synthesize the signal lights of the odd numbered or even numbered wavelength groups separated by the first branching filter, and a second multiplexer to sequentially combine the signal lights synthesized by the first multiplexer with the signal lights of the even numbered or odd numbered wavelength groups separated by the first branching filter.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Embodiments of the present invention will now be described with reference to the accompanying drawings.

First Embodiment

Figure 8:
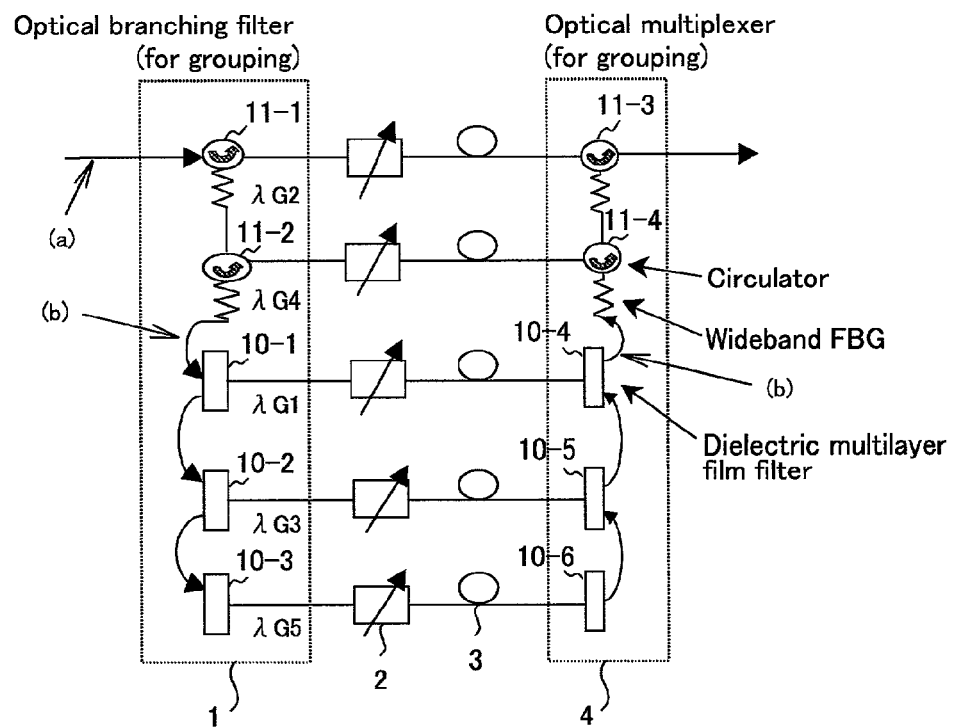
FIG. 8 shows a first embodiment of an optical multiplexer/branching filter according to the present invention.

FIG. 8 shows a configuration example of an optical multiplexer/branching filter as an example of an optical device in accordance with the present invention.

In FIG. 8, the optical branching filter 1 is made up, allowing it to have the optical circulator circuits 11-1 and 11-2 as the first branching filter, and the dielectric multilayer film filters 10-1 through 10-3 as the second branching filter.

The optical multiplexer 4 is made up, allowing it to have the dielectric multilayer film filters 10-4 through 10-6 as the first multiplexer, and the optical circulator circuits 11-3 and 11-4 as the second multiplexer.

Figure 9:
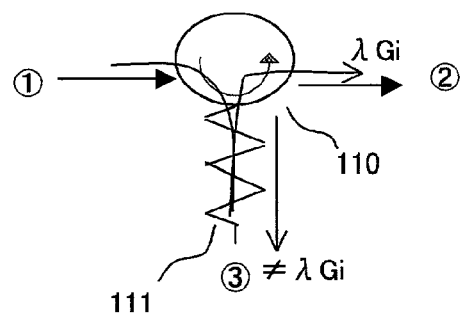
FIG. 9 shows the configuration of an optical circulator circuit as the first branching filter in the embodiment of FIG. 8.

Each of the optical circulator circuits 11-1 through 11-4 as the first branching filter consists of the optical circulator 110 with three terminals as illustrated in FIG. 9, and the fiber grating (FBG) 111 to be connected to these terminals.

The optical circulator 110 is a non-reciprocal device having a function to separate the incoming light and outgoing light, when the incoming light and outgoing light are in circulating relation. The device is made up of the utilization of a Faraday effect and polarization synthesizing/separation.

Figure 10:
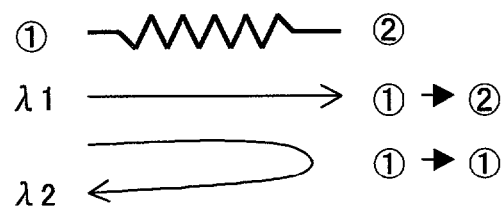
FIG. 10 is an explanatory diagram of a fiber grating (FBG)

Moreover, the fiber grating (FBG) 111 is allowed to have fine pitched periodic refractive index distribution within the core along the axis of the optical fiber. As illustrated in FIG. 10, the fiber grating (FBG) 111 functions as a narrow band wavelength filter, and it will reflect only the specified wavelength band lights ((1)-(1)), but will allow the optical signals of other bands to pass through ((1)-(2)).

Figure 11:
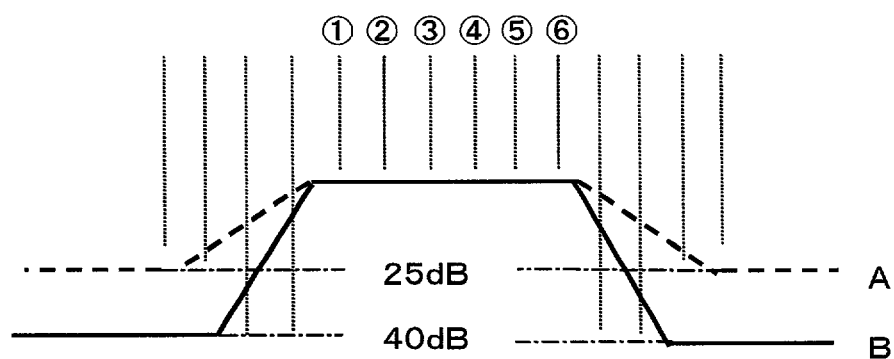
FIG. 11 shows the characteristic comparison between the dielectric multilayer film filter and the fiber grating (FBG)

FIG. 11 compares the characteristics between the dielectric multilayer film filter and fiber grating (FBG). FIG. 11-A shows the band characteristic of the dielectric multilayer film filter, and FIG. 11-B shows the band characteristic of the fiber grating (FBG). As understood from FIG. 11, with the use of the fiber grating (FBG), a further steeper cutoff characteristic can be obtained, compared with the dielectric multilayer film filter.

The following is further detailed description of the optical circulator circuits 11-1 through 11-4 with the use of the fiber grating (FBG) having such a characteristic, referring back to FIG. 9. In FIG. 9, in case when (1) and (2) represent the I/O terminals of the optical circulator 110, and (3) represent the terminal of the fiber grating (FBG) 111, out of the incident lights to the terminal (1), the specified wavelength group Gi will be reflected by the fiber grating (FBG) 111, and outputted to the output terminal (2) of the optical circulator 110.

On the other hand, the other wavelength groups than the specified wavelength group Gi will directly pass through the fiber grating (FBG) 111, and will be transmitted to the terminal (3).

The following table shows the summarized comparison of the typical characteristics between the circulator circuit using such a circulator and fiber grating as described above, and the dielectric multilayer film filter.

|  | Circulator Circuit (Fiber Grating + Circulator) | Dielectric Multilayer Filter |
|---|---|---|
| Insertion Loss ((1)→(2)) | 1.4 dB | 1.5 dB |
| Insertion Loss ((1)→(3)) | 0.8 dB | 0.3 dB |
| Amount of Isolation ((1)→(3), Value for Cutoff Wavelength) | >40 dB | >25 dB |
| Cutoff Characteristics | It is possible to create steeper cutoff characteristic, compared with the | |

| Circulator Circuit (Fiber Grating + Circulator) | Dielectric Multilayer Filter |
|---|---|
| | dielectric multilayer filter, while securing the flatness within the transmission band. |

On the optical branching filter 1 which uses the optical circulator circuits 11-1 through 11-4 with such a characteristic as given above, the circulator circuit 11-1 and circulator circuit 11-2 making up the first branching filter, are connected in series as illustrated in FIG. 8, and the branching filter will sequentially separate the signal lights of the wavelength multiplexed even numbered channel groups, more specifically, in an example shown in FIG. 8, the signal lights corresponding to the wavelength groups G2 and G4 belonging to the second and the fourth channel groups.

In other words, on the circulator circuits 11-1 and 11-2, the optical signals of the wavelength groups G2 and G4 that have been reflected by the fiber grating (FBG) will be reflected and inputted to the respective circulators, so as to further input to the circulator circuits 11-3 and 11-4 for the applicable optical multiplexer 4, through the optical attenuator 2 and the dispersion compensation module 3 such as dispersion compensation fiber.

Figure 12:
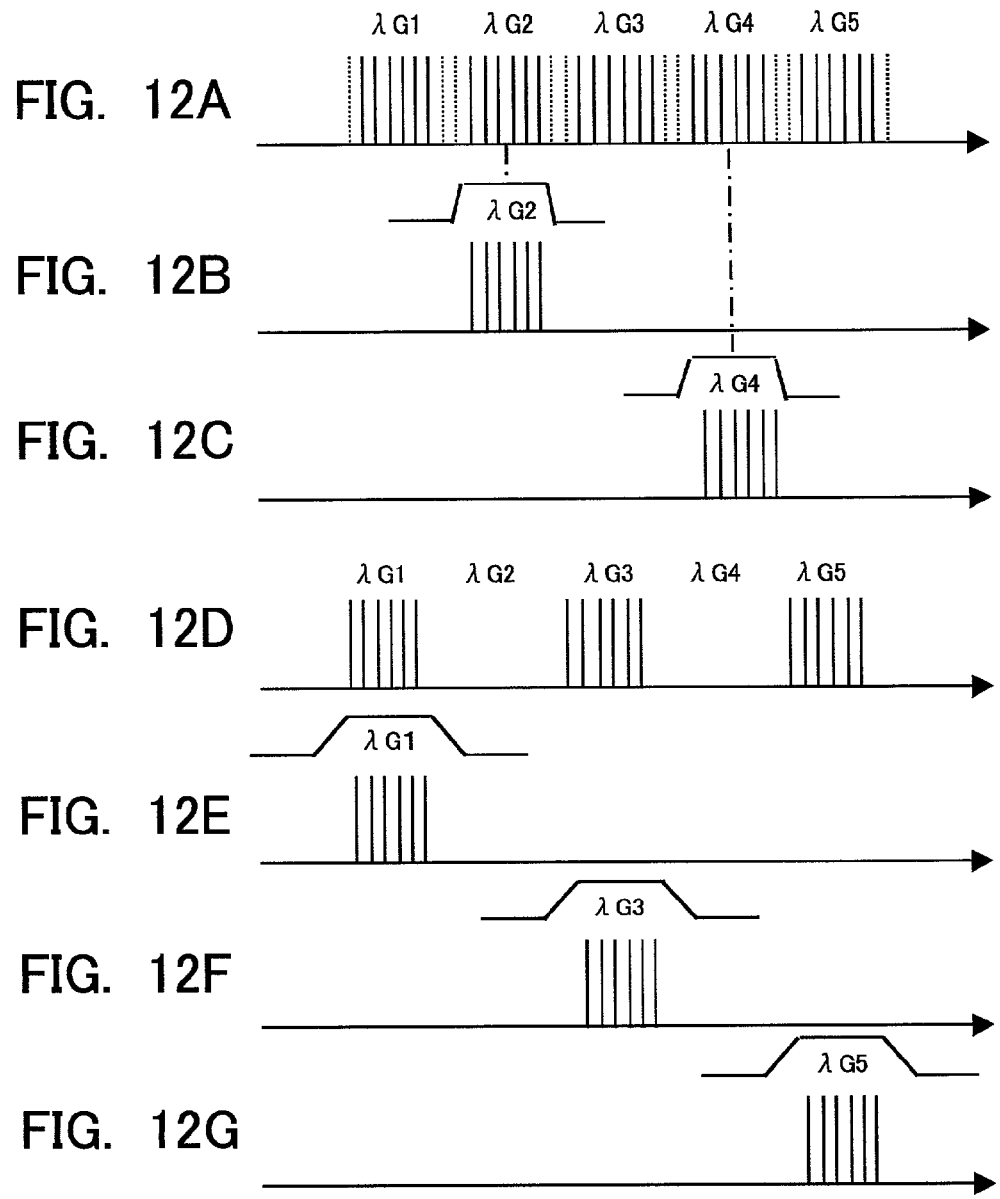
FIGS. 12A through 12G show wavelength spectrums at each section shown in FIG. 8.

FIGS. 12A to 12G show this relation. FIG. 12A shows the input signal wavelength at the (a) point noted in FIG. 8. FIG. 12B shows the optical signal wavelength of the G2 wavelength group to be outputted from the optical circulator circuit 11-1. In addition, FIG. 12C shows the optical signal wavelength of the G4 wavelength group to be outputted from the optical circulator circuit 11-2.

Therefore, as to the input of the dielectric multilayer film filter 10-1 for the optical branching filter 1, as illustrated in FIG. 12D, the even numbered wavelength groups G2 and G4 (FIGS. 12B and 12C) are excluded from the wavelength groups (FIG. 12A) of the wavelength multiplexed optical input signal lights, so each group-to-group spacing is extended.

Then, because of the condition where each group-to-group spacing being extended, it is possible to use the dielectric multilayer film filters 10-1 through 10-3, which are connected in series and have a milder cutoff characteristic, as the second branching filter, and this branching filter will sequentially separate the odd numbered wavelength groups G1, G3 and G3 (See FIGS. 12E, 12F and 12G).

Figure 5A:
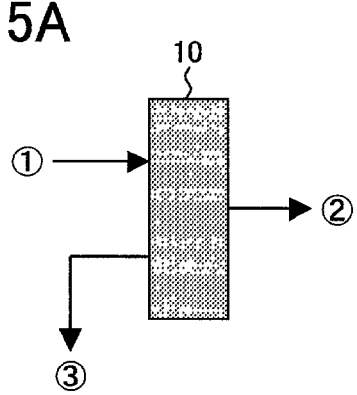
FIGS. 5A and 5B are explanatory diagrams of a dielectric multilayer film filter.

The principle of separating the wavelength groups GI, G3 and G5 on the dielectric multilayer film filters 10-1 through 10-3 is the same as the movement previously described in FIG. 5A.

While on the optical multiplexer 4 illustrated in FIG. 8, the odd numbered wavelength groups G1, G3 and G5 will be synthesized by the first multiplexer consisting of the dielectric multilayer film filters 10-4 through 10-6.

For the synthesized wavelength groups G1, G3 and G5, the even numbered wavelength groups G4 and G2 will be sequentially synthesized and outputted with the second multiplexer consisting of the circulator circuits 11-3 and 11-4 having the combination of the circulator 110 and the fiber grating (FBG) 111.

Here, although the fiber grating 111 has a steep cutoff characteristic and flatness within the band, when this fiber grating is used by combining with the circulator 110, loss will increase. However, in the configuration as illustrated in the FIG. 8, as the guard band GB can be widened, the dielectric multilayer film filters 10-1 through 10-3 having a milder cutoff characteristic can be used together. As the result of this possibility of use, low-loss optical multiplexer/branching filter with high band use efficiency can be constructed.

Figure 7:
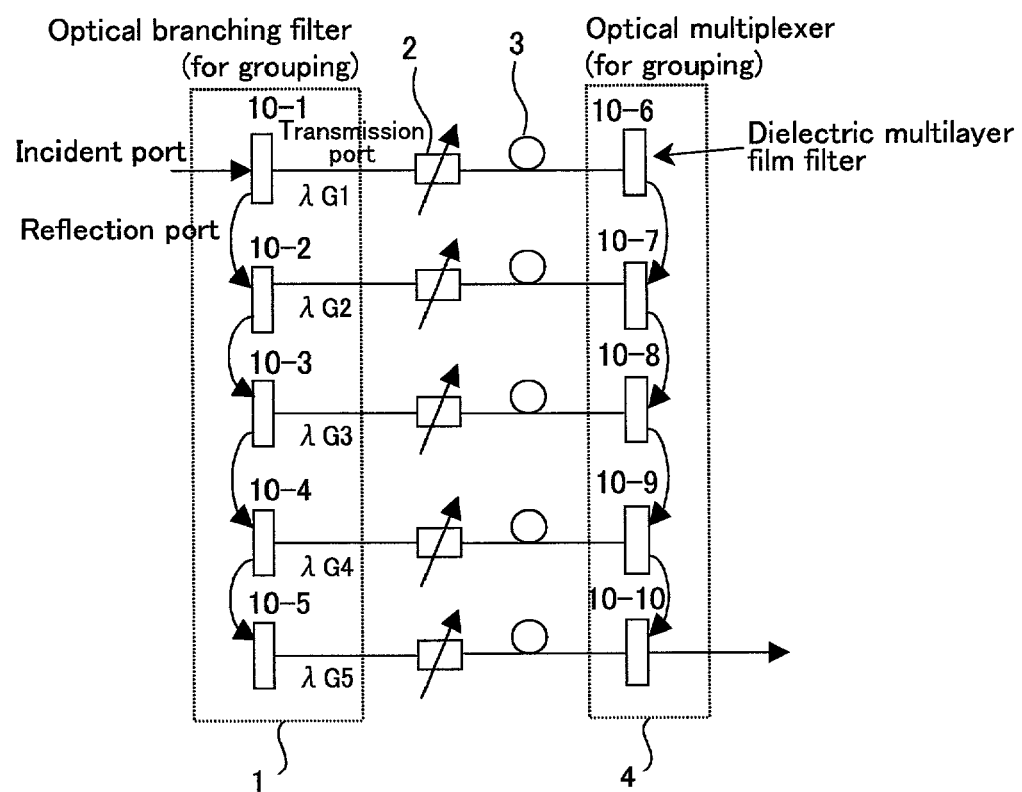
FIG. 7 shows the conventional optical multiplexer/branching filter to be composed of the multistage combination of the dielectric multilayer film filters as shown in FIG. 5.

As illustrated in FIG. 12A, in an example of embodiment shown in FIG. 8, the band use efficiency of the input signal is (6, 2), in other words, the number of wavelengths within the group is improved to 6, and the number of dead wavelengths within the guard space GB is also improved to 2. In this case, the band use efficiency is improved to 75%, while the band use efficiency (5, 3) in the conventional example shown in FIG. 7 is 62%.

Also in the configuration according to an ample of embodiment shown in FIG. 8, the wavelength groups are first thinned out, and this thinning out process enables the dielectric multilayer film filters 10-1 through 10-3 to be used at the later stage. With the combination of these circulator circuits and the dielectric multilayer film filters, transmission loss can be minimized.

Figure 13:
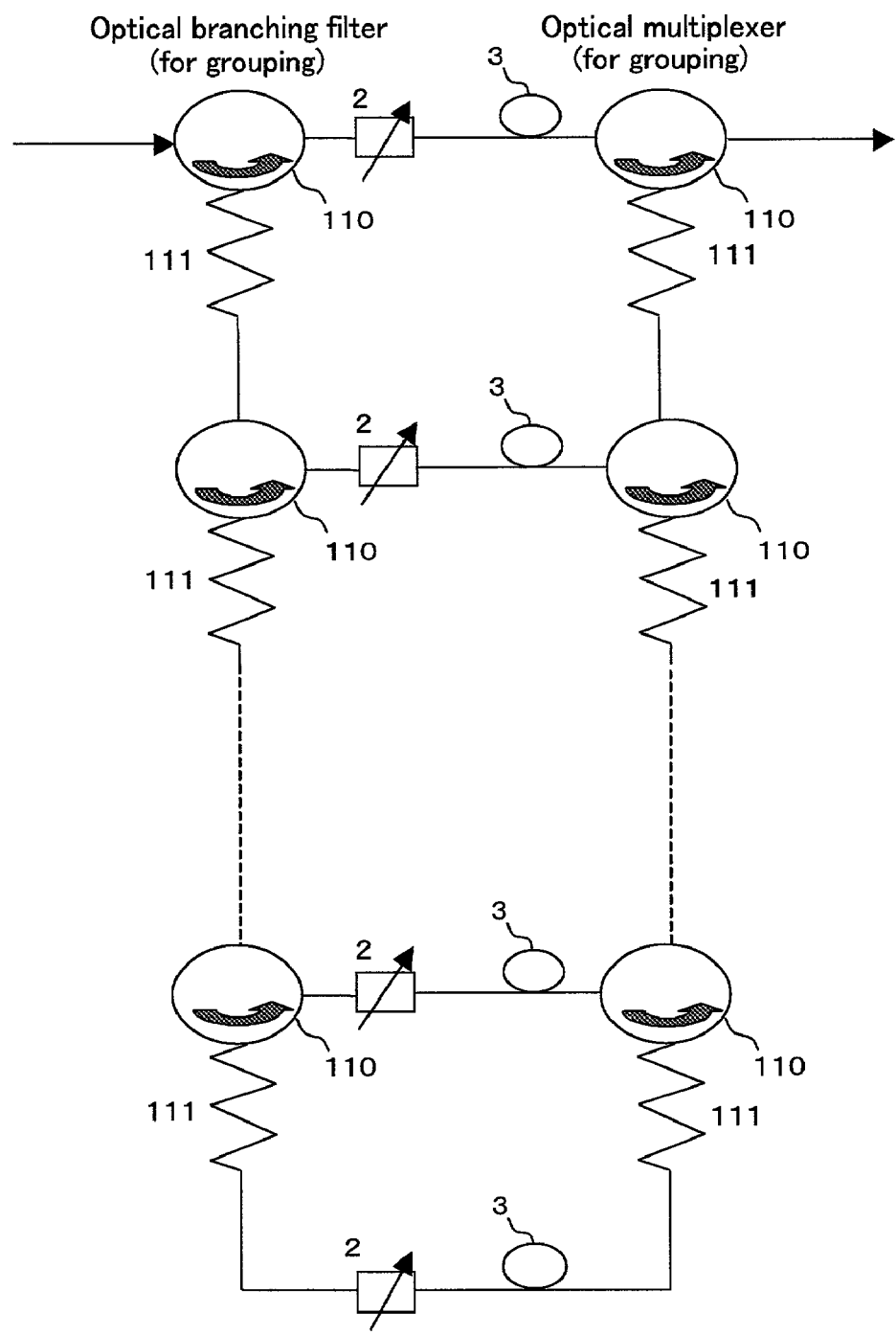
FIG. 13 is a diagram showing an example of the configuration of an optical multiplexer/branching filter with the use of only a circulator circuit.

Here, based on the principle, an optical multiplexer/branching filter can be organized, as illustrated in FIG. 13, only with a circulator circuit having the circulator 110 and the fiber grating 111.

Moreover, the wavelength group Gi contains six or more optical signals lined up at intervals of 50 GHz, and a guard area, where any signal under 150 GHz is not provided, is provided at each wavelength group-to-group. Therefore, a wideband of 300 Hz minimum is required as the bandwidth for the fiber grating.

In addition, in an example of embodiment shown in FIG. 8, first even numbered wavelength signal groups are separated, and next, odd numbered wavelength signal groups are separated, but application of the invention is not limited to such a separation order. In other words, such configuration is possible that first separate odd numbered wavelength signal groups, and next, separate even numbered wavelength signal groups.

Second Embodiment

Figure 14:
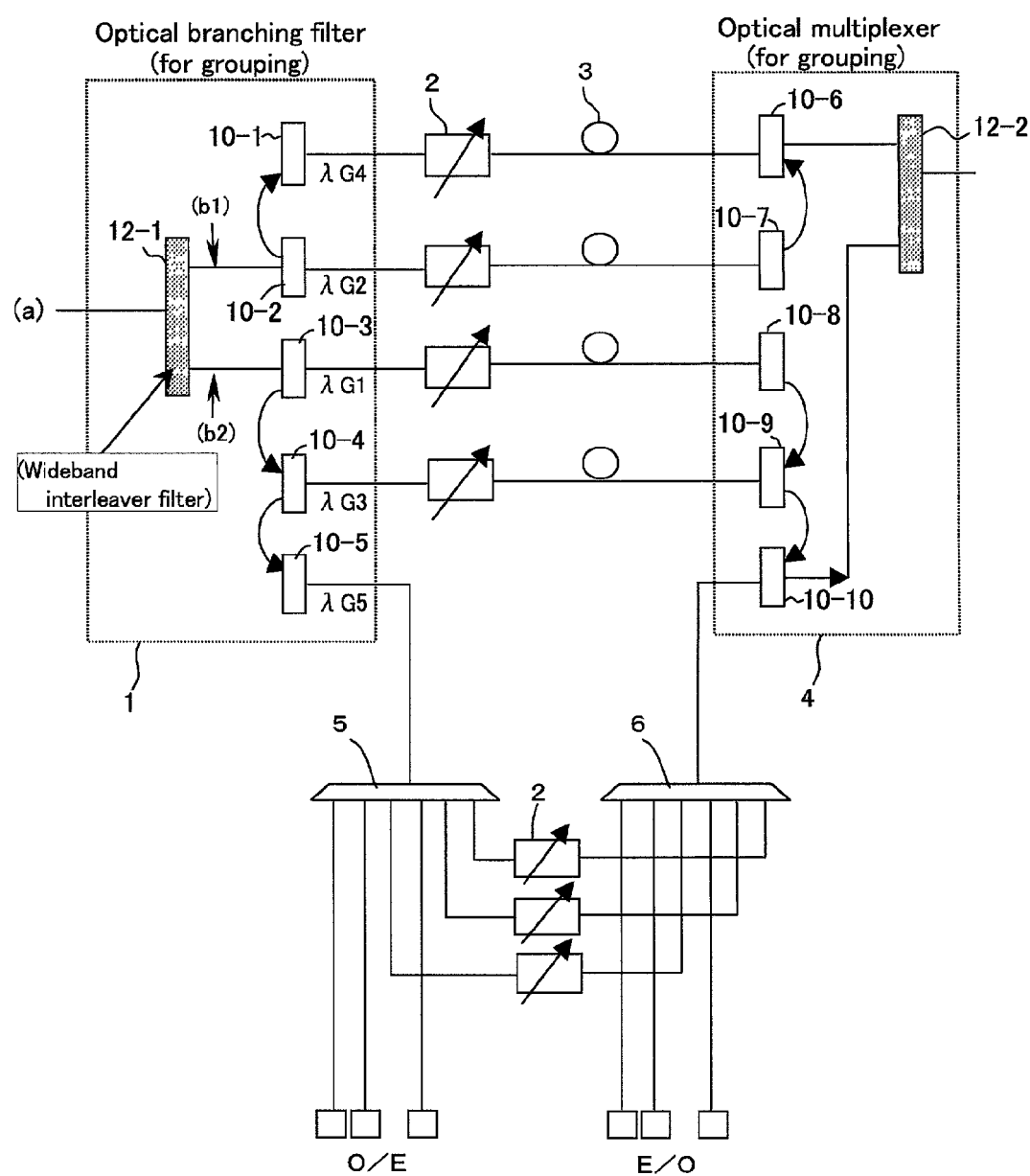
FIG. 14 shows a second embodiment of an optical multiplexer/branching filter according to the present invention.

FIG. 14 further shows an example of embodiment No. 2 of an optical multiplexer/branching filter as an example of an optical device in accordance with the present invention. FIG. 15 shows wavelength component spectrum at each applicable location noted in FIG. 14. Also, FIG. 16 illustrates the wavelength separation characteristic in the embodiment.

Figure 16:
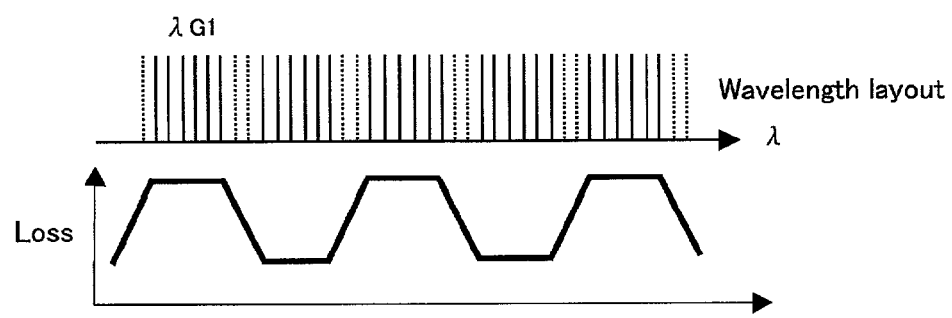
FIG. 16 is an explanatory diagram of the wavelength separation characteristic in an example of the second embodiment.

The feature of the embodiment shown in FIG. 14 is to separate wavelength group signal lights alternately with the filter (wideband interleaver filter) 12-1, which has a periodic wavelength separation characteristic as shown in FIG. 16, and a steep cutoff characteristic.

Figure 15A:
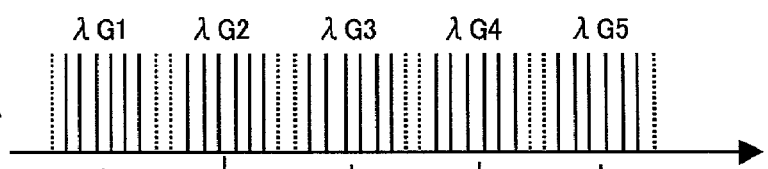
FIGS. 15A, 15B and 15C show wavelength spectrums at each applicable location as given in FIG. 14.
Figure 15B:
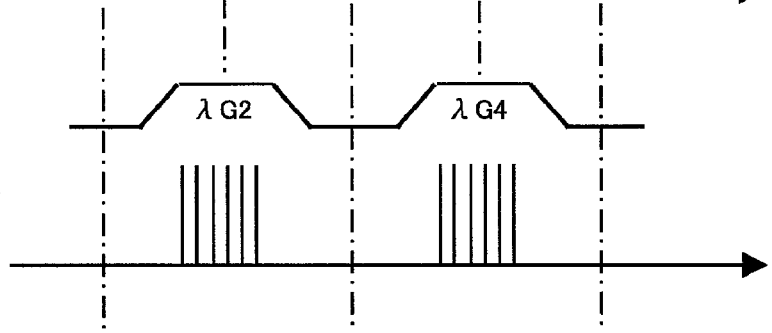
Figure 15C:
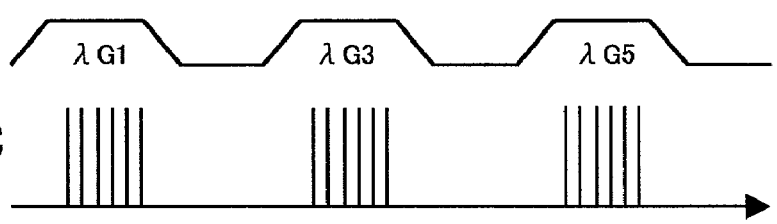

In other words, at the (a) point of the input end for the optical branching filter as illustrated in FIG. 15A, separate the wavelength groups G1 through G5 with the filter 12-1 which functions as the first branching filter, into the even numbered wavelength groups G2 and G4 (FIG. 15B), and the odd numbered wavelength groups G1, G3 and G5 (FIG. 15C).

Thus, when each wavelength group-to-group spacing is widened, use as the second branching filter, the multilayer dielectric film filters 10-1, 10-2, 10-3, 10-4 and 10-5, because their relatively milder cutoff characteristic compared with the filter (wideband interleaver filter) 12-1 is allowable in this case.

In other words, separate the even numbered wavelength groups G2 and G4 sequentially with the multilayer dielectric film filters 10-1 and 10-2, the component elements of the second branching filter. At the same time, separate the remaining odd numbered wavelength groups G1, G3 and G5 sequentially with the multilayer dielectric film filters 10-3, 10-4 and 10-5, the component elements of the second branching filter.

As the synthesizing procedure on the optical multiplexer 4 is the reverse order of the separating procedure on the optical branching filter 1, sequentially synthesize the even numbered wavelength groups G2 and G4 with the multilayer dielectric film filters 10-6 and 10-7, the component elements of the first multiplexer, and in the same manner, sequentially synthesize the odd numbered wavelength groups G1, G3 and G5 with the multilayer dielectric film filters 10-8, 10-9 and 10-10, the component elements of the second multiplexer, on a wavelength group-by-group basis.

Next, synthesize and output the already synthesized odd and even numbered wavelength groups with the filter (wideband interleaver) 12-2, which functions as the second multiplexer. The characteristic of the second filter 12-2 is the reverse characteristic of the first filter 12-1. In other words, it has the function to insert and synthesize the already separated wavelength group on one side into the wavelength group on the other side at the wavelength axis.

Here, the filters 12-1 and 12-2 can apply the waveguide path type MZ (Mach-Zehnder) interferometer type interleave multiplexer/branching filter as an example of implementation.

Figure 1:
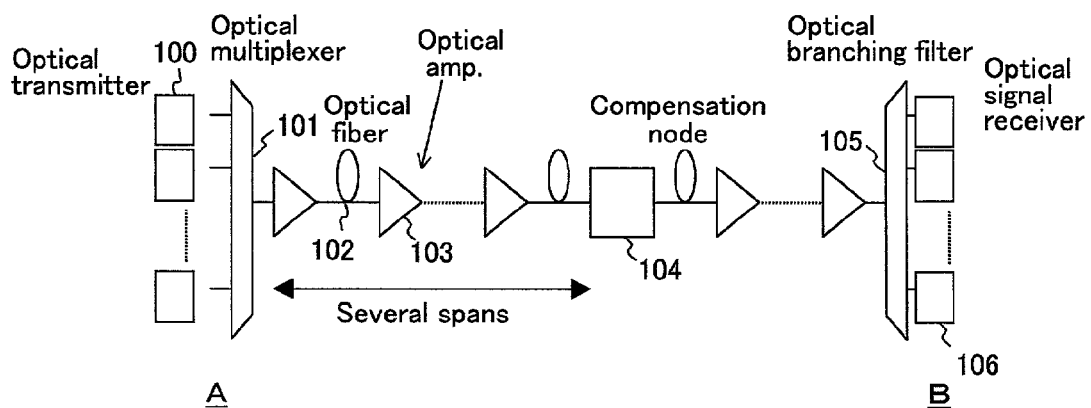
FIG. 1 shows an example of the configuration of an optical multiplexing transmission system with a compensation node.
Figure 2:
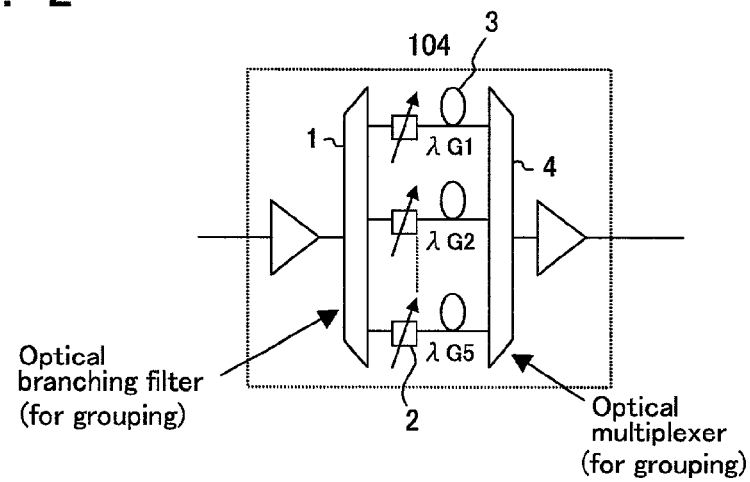
FIG. 2 shows an example of the configuration of an optical multiplexer/branching filter to be placed at a compensation node.
Figure 3:
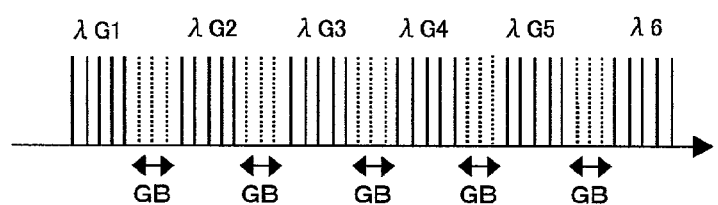
FIG. 3 is an explanatory diagram of wavelength groups.
Figure 4:
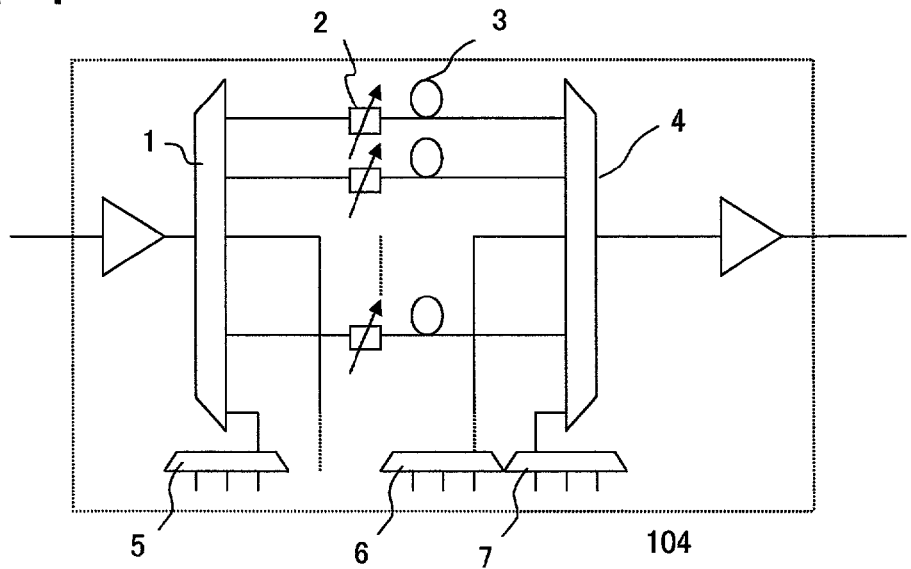
FIG. 4 shows the configuration of an optical multiplexer/branching filter to add/drop optical signals at a compensation node.

For example, like the study result released on p. 202 (C-3-96) of the collection of draft papers presented at the 1999 Electronics society Meeting held by the Electronic Information Academic Society, with the two-stage connection of MZ (Mach-Zehnder) interferometers, whose phase differences are 2L and 1L, respectively, a comb-shaped filter characteristic, like the filter characteristic as shown in FIG. 2 of the collection of draft papers, can be achieved. Therefore, by making this comb-shaped filter characteristic compatible with the transmission characteristic as shown in FIG. 16, the filter on the side of the optical branching filter 1 can be obtained.

On the other hand, as the I/O characteristic of the filter 12-1 is of a reversible type, by inverting the input and output, on the filter 12-2 on the side of the optical multiplexer 4, in the same configuration as that of the filter 12-1, it will become possible to insert one wavelength group to the other wavelength group at the wavelength axis so as to synthesize them.

Here, as the second branching filter, a configuration with the use of the AWG (Arranged Waveguide Grating), that applied in an example of embodiment to be described later, can be made, and also, with the combination of the filters 12-1 and 12-2, the component elements of the interleaver, it will become possible to create an optical circuit on the same waveguide path circuit board, thereby enabling to achieve a compact size and low cost.

And, in the example of embodiment, each wavelength group consists of at least six signals lined up at intervals of 50 GHz, and each wavelength group sets a guard space, where it does not set any signal under 150 GHz. For the band of the flat area of the wideband interleaver filters 12-1 and 12-2, at least 300 GHz is required.

Moreover, FIG. 14 also shows a configuration when the Add/Drop filter is applied. The Add/Drop filter area consists of the DMUX filter 5 and MUX filter 7 being provided. Also, when signals will be inputted to the MUX filter 7, without being branched off from the DMUX filter 5, the level adjuster 2 is provided because of the need of level adjustment.

Third Embodiment

Figure 17:
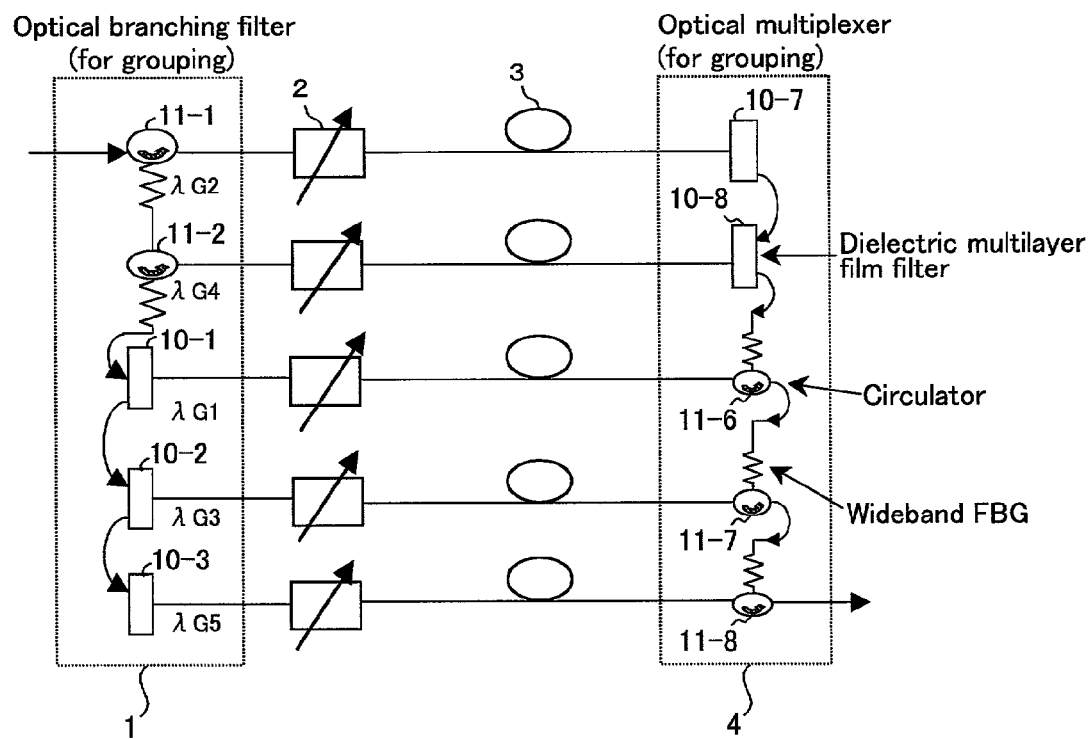
FIG. 17 shows the second embodiment of the optical multiplexer/branching filter according to the present invention, which is a variant of the embodiment shown in FIG. 8.

FIG. 17 shows a variation of the example of embodiment shown in FIG. 8. In the configuration as illustrated in FIG. 17, the configuration of the optical branching filter 1 is the same as the configuration in the example of embodiment shown in FIG. 8. The different point is that the order of synthesizing the already separated wavelength groups on the multiplexer 4 is the reverse order used in an example of embodiment illustrated in FIG. 8.

In an example of embodiment shown in FIG. 8, the configuration is made so as to sequentially synthesize starting from the signal lights of the already separated odd numbered wavelength groups with the dielectric multilayer film filters 10-4 through 10-6, and next, sequentially synthesize the signals of the even numbered wavelength groups with the circulator circuits 11-3 and 11-4.

On the contrary, in the embodiment of FIG. 17, the configuration is made so as to first sequentially synthesize the signal lights of the already separated even numbered wavelength groups with the dielectric multilayer film filters 10-7 and 10-8, and next, with the circulator circuits 11-6 through 11-8, sequentially synthesize the signal lights of the odd numbered wavelength groups.

Further, in the embodiment shown in FIG. 17, like the configuration shown in FIG. 13, it is also possible to replace the dielectric multilayer film filters 10-7 and 10-8 with the circulator circuits 11-6 through 11-8.

Fourth Embodiment

Figure 18:
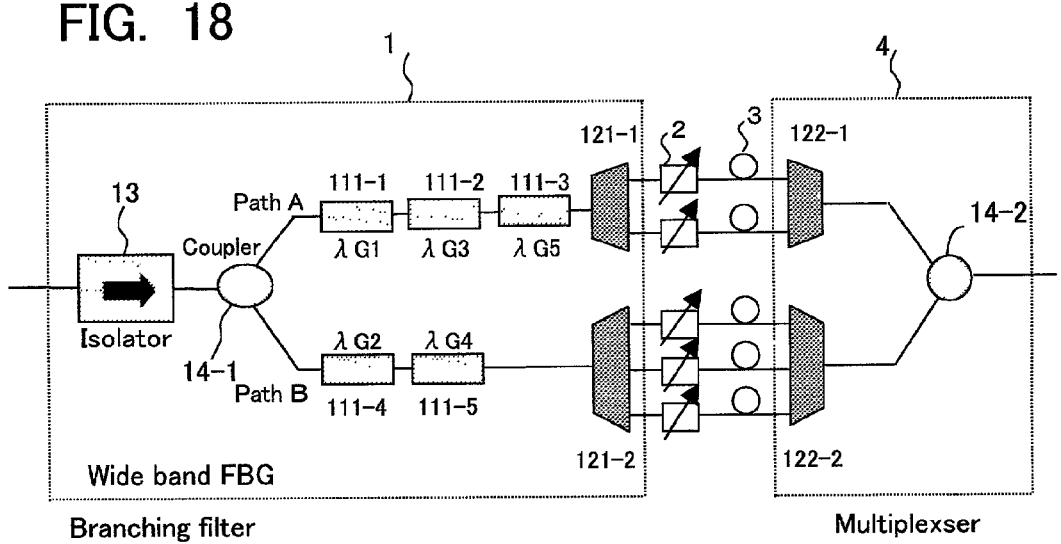
FIG. 18 shows a fourth embodiment of the present invention.
Figure 19A:
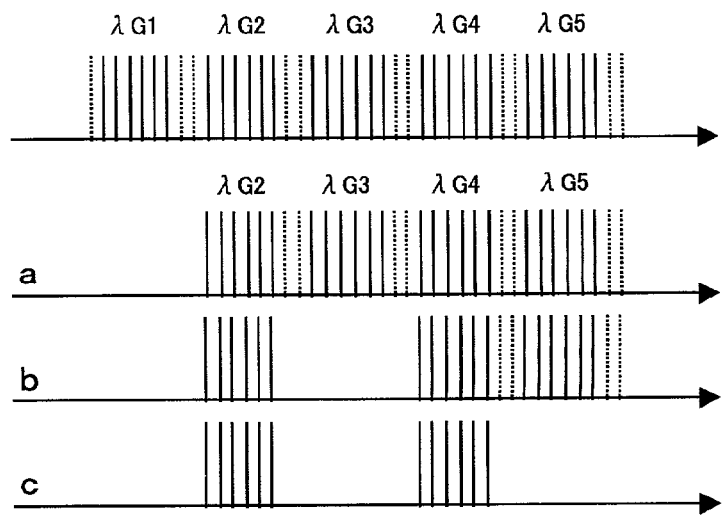
FIGS. 19A and 19B show wavelength spectrums at each location in the embodiment shown in FIG. 18.
Figure 19B:
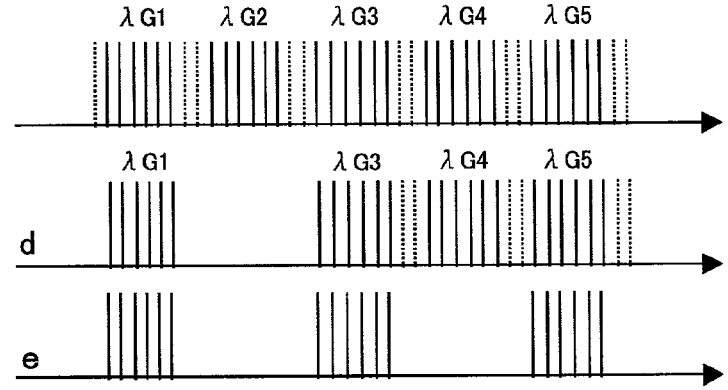

FIG. 18 shows an example of forth embodiment of the invention. This is an example of organizing an optical multiplexer/branching filter with the combination of a wideband interleaver filter and a dielectric multilayer film filter. FIGS. 19A and 19B show wavelength spectrum at each applicable location noted in FIG. 18.

It is possible to organize a wideband interleaver filter with the use of a wideband fiber grating. The configuration with a fiber grating has the advantage over the configuration with the multistage connection of Nach-Zehnder interferometers in achieving the isolation amount.

On the optical branching filter 1, the wavelength multiplexed optical signals (FIG. 19A) will be inputted to the coupler 14-1 through the isolator 13, and then will be double-branched off to the path A and path B (FIG. 19A, FIG. 19B). To the path A, the wideband fiber gratings 111-1 through 111-3, that are corresponding to the wavelengths G1, G3 and G5 of the odd numbered groups, are vertically multistage connected. While to the path B, the wideband fiber gratings 111-4 and 111-5, which are corresponding to the wavelengths G2 and G4 of the even numbered groups, are vertically connected.

On the path A, the wideband fiber gratings 111-1 through 111-3, that are corresponding to the wavelengths G1, G3 and G5 of the vertically multistage connected odd numbered groups, each having the function as illustrated in FIG. 10, block the optical signals of the wavelength groups G1, G3 and G5 from passing. Therefore, from the path A, the optical signals of the even numbered wavelength groups G2 and G4 will be outputted (a through c of FIG. 19A).

While as shown in FIG. 19B, on the path B, the wideband fiber gratings 111-4 and 111-5, that are corresponding to the wavelengths G2 and G4 of the vertically connected even numbered groups, each having the function as illustrated in FIG. 10, block the optical signals of the wavelength groups G2 and G4 from passing. Therefore, from the path B, the optical signals of the odd numbered wavelength groups G1, G3 and G5 will be outputted (d and e of FIG. 19B).

As described above, the optical signals (c of FIG. 19A) of the even numbered wavelength groups G2 and G4 to be outputted from the path A will be further inputted to the branching filter 121-1, and the optical signals (e of FIG. 19B) of the odd numbered wavelength groups G1, G3 and G5 to be outputted from the path B will be inputted to the branching filter 121-2.

Figure 5B:
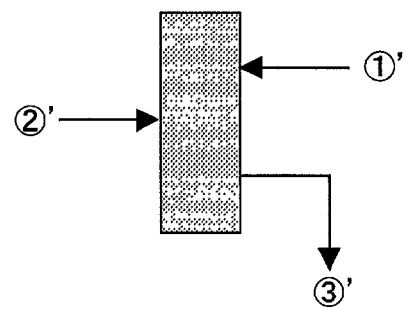
Figure 6:
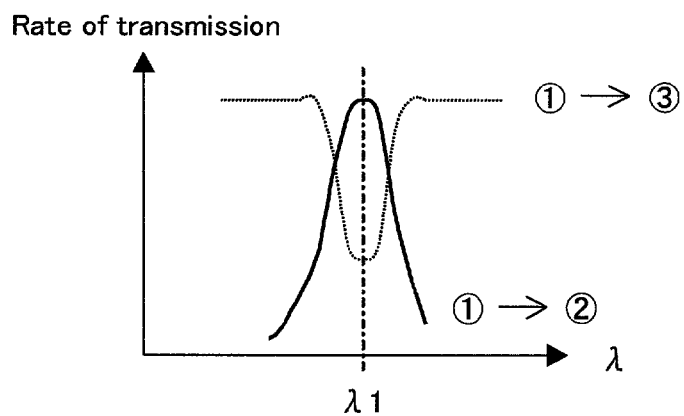
FIG. 6 shows the transmission characteristics of the dielectric multilayer film filter.

The branching filters 121-1 and 121-2 can be organized with the dielectric multilayer film filter as illustrated in FIG. 5. On the branching filter 121-1, the optical signals of the inputted even numbered wavelength groups G2 and G4 will be separated and outputted, respectively. While on the branching filter 121-2, the optical signals of the inputted odd numbered wavelength groups G1, G3 and G5 will be separated and outputted, respectively. As described above, in the configuration shown in FIG. 18, as two different branching filters, 121-1 and 121-2 are provided to match to even numbered wavelength groups and odd numbered wavelength groups, the wave separation characteristic required for the dielectric multilayer film filter, the component element of these branching filters, can be loosened.

Moreover, in FIG. 18, in order to make the device compact, based on the principle illustrated in FIG. 10, it is possible to form the fiber gratings 111-1, 111-2 and 111-3 on the path A, having different blocking wavelengths, and the fiber gratings 111-4 and 111-5 on the path B, having different blocking wavelengths, into one piece within the same optical fiber, individually on the path A and path B.

Fifth Embodiment

Here, in the previous embodiment, the pre-condition is that the same number of wavelengths must be employed for the number of wavelengths within each wavelength group, however, application of the invention is not limited to such a case. With the use of the combination of filters that support different number of grouped wavelengths, the band use efficiency (=signal bandwidth per one wavelength group/periodic wavelength intervals of grouped wavelength) can be improved.

Figure 20:
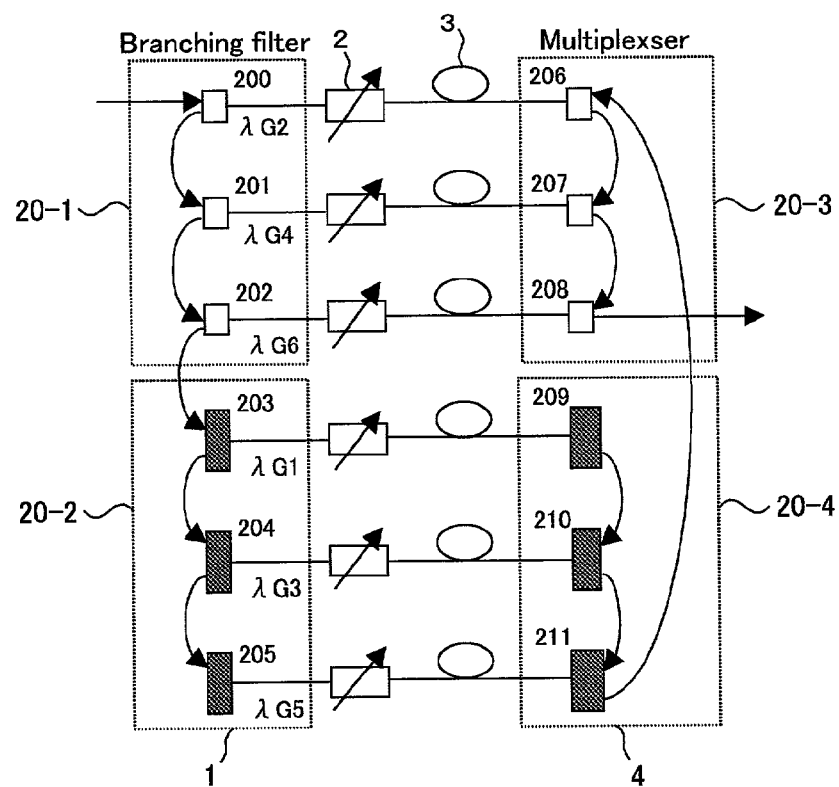
FIG. 20 shows a fifth embodiment of the present invention.

FIG. 20 shows the embodiment of an optical multiplexer/branching filter, which embodies such an application.

The optical branching filter 1 is comprised, at every other wavelength group, of the first filter element group 20-1, that has small number of wavelengths in the group and steep inclination characteristic, and of the second filter element group 20-2, that has larger number of wavelengths in the group and cutoff characteristic with a milder inclination, compared with the first filter element group 20-1.

As for each filter that makes up the first filter element group 20-1 and the second filter element group 20-2, the multilayer dielectric filter as previously described in FIG. 5 can be used, and accordingly, the relation of connecting the input and the output of the first filter element group 20-1 and the second filter element group 20-2 in FIG. 20 can be easily understood from FIG. 7 or FIG. 8.

Figure 21A:
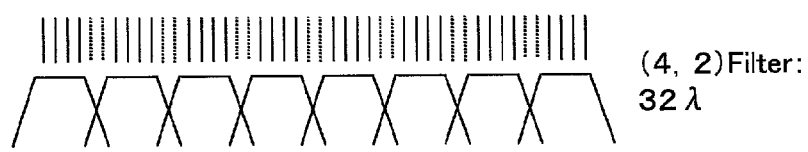
FIGS. 21A, 21B and 21C show wavelength layouts when the filters of (4, 2) and (8, 4) are used in the fifth embodiment.

For instance, on the first filter element group 20-1 using the filters 200 through 202, each having the band use efficiency (4, 2) as illustrated in FIG. 21A, sequentially extract and separate the even numbered wavelength groups G2, G4 and G6. By doing so, each wavelength group-to-group spacing, in other words, the guard space will be widened.

Figure 21B:
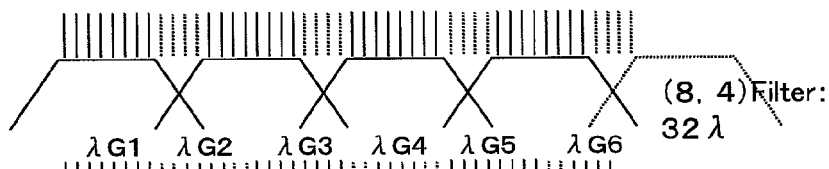

Next, sequentially extract and separate the odd numbered wavelength groups G1, G3 and G5 with the second filter element group 20-2 using the filters 203 through 205, where the number of wavelengths within the group is more than that of the first filter element group 20-1, and the inclination of the cutoff characteristic is milder, for instance, the band use efficiency of each filter is (8, 4) as shown in FIG. 21B.

While, corresponding to the configuration of the optical branching filter 1, the optical multiplexer 4 consists of the third filter element group 20-3 of the filters 206 through 208 having small number of wavelengths within the group and a steep inclination characteristic, each of which synthesizes the even numbered wavelength groups G2, G4 and G6, and of the fourth filter element group 20-4 of the filters 209 through 211, having larger number of wavelengths and milder inclination characteristic, compared with the third filter element group 20-3, each of which synthesizes the odd numbered wavelength groups G1, G3 and G5.

The odd numbered wavelength groups G1, G3 and G5 are sequentially synthesized by the filters 209 through 211 of the fourth filter element group 20-4, then, the even numbered wavelength groups G2, G4 and G6 are sequentially synthesized by the filters 206 through 208 of the third filter element group 20-3.

Figure 21C:
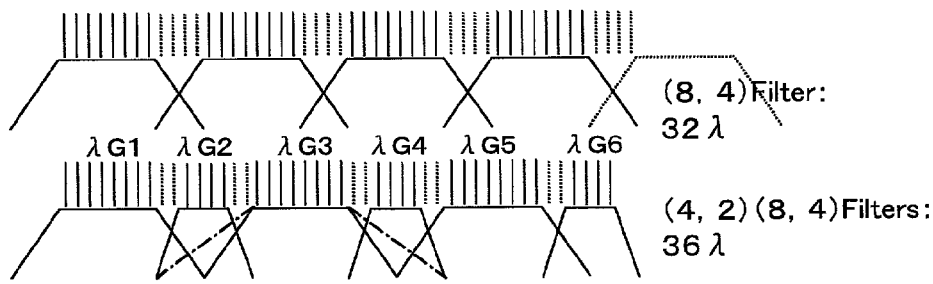

Thus the band use efficiency can be improved to 12/16: 75% as shown in FIG. 21C.

Here, the important characteristic required for each of the filters 200 through 211 of the filter element groups 20-1 through 20-4 is the isolation characteristic to block out-of-band signals, while keeping the flatness within the band. If the out-of-band cutoff characteristic is not sufficiently secured, after signals are separated or synthesized, the same signal via other filter areas may become coherent cross-talk component, thereby causing the signal receiving characteristic to be deteriorated.

In the wavelength division multiplexing communication system, coherent cross-talk component should be −30 dB maximum. The amount of coherent cross-talk accumulates every time signals pass through the optical multiplexer/branching filter for the compensation node 104. Due to this reason, assuming that signals pass through 10 nodes of compensation node, as the isolation amount for the filter area, less than −40 dB per 1 node, 20 dB minimum should be secured.

However, on the dielectric multilayer film filter, it is difficult to enlarge the zone of the flat area, while keeping the same inclination, and, for instance, the zone that can secure the isolation of 20 dB should be twice the flat area.

FIGS. 21A and 21B show the wavelength layout with the use of the filters, where the band use efficiency being (4, 2) and (8, 4), respectively, but, if the filter of (4, 2) or the filter of (8,4) is used, the number of wavelengths that can be supported will be 32, within the range as noted in the Figs., in short, not changed.

However, apply an example of this embodiment, and first separate signals of even numbered wavelength groups with the first filter element group 20-1 consisting of the filters 200–202 having the band use efficiency (4, 2), and then separate signals of odd numbered wavelength groups with the second filter element group 20-2 consisting of the filters 203 through 205 having the band use efficiency (8, 4). In such a case, the number of wavelengths becomes 36, which means that the number of supporting wavelengths can be improved.

Moreover, as for the filters 203 through 205, the characteristic shown in FIG. 21C with the dotted line is allowable, and as for the filter 20-2 of the band use efficiency (8, 4), a further milder slope characteristic is allowable, thereby resulting in significantly loosened characteristic requirement and expectation for yield improvement.

Moreover, with the same technique, three or more filters having different number of grouped wavelengths may be combined. First separate several grouped signals with filters having small number of wavelength groups, and next separate grouped signals sequentially with filters having small number of wavelength groups. To synthesize signals, the reverse procedure is performed.

This technique can also be applied to other examples of embodiments described above.

Moreover, as the slope compensation and level compensation against the wavelength within the same wavelength group on the compensation node 104 will be deteriorated, the maximum number of wavelength groups should be determined upon due consideration given to the accuracy in dispersion slope compensation and the accuracy in level adjustment.

Mixing within the use wavelength area and changing the method of use depending on the short wavelength side and long wavelength side may be allowed. For example, at an optical amplifier in the C band of 1530 through 1560 nm, gain fluctuation per wavelength on the short wavelength side is large.

For this reason, from the point of level control, it is required to set small number for the wavelength band width (number of grouped wavelengths) on the short wavelength side and adjust frequently, while on the long wavelength side, as gain difference is small over wide area, a larger number can be set for the wavelength band width (number of grouped wavelengths). The following configuration may be allowed that on the short wavelength side, separate/synthesize signals to each group with the filters of the number of grouped wavelengths of (4, 2), and on the long wavelength side, separate/synthesize signals, setting larger wavelength band width (number of grouped wavelengths).

Sixth Embodiment

Figure 22:
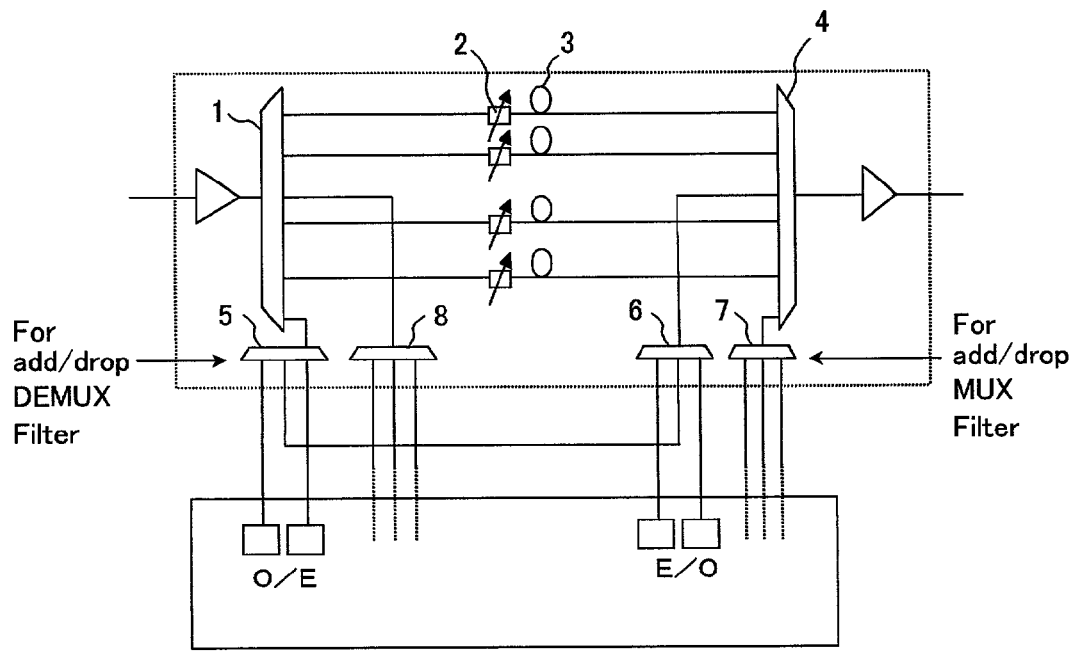
FIG. 22 shows an embodiment with a DMUX/MUX filter for add/drop is provided for an optical multiplexer/branching filter.

The present invention may further be applied to the Add/Drop filter area. FIG. 22 shows the configuration that the DMUX filters 5 and 8 for Add/Drop, and the MUX filters 6 and 7 are provided for the compensation node 104.

These filters can be organized with the previously described dielectric multilayer film filter or fiber grating.

Figure 23:
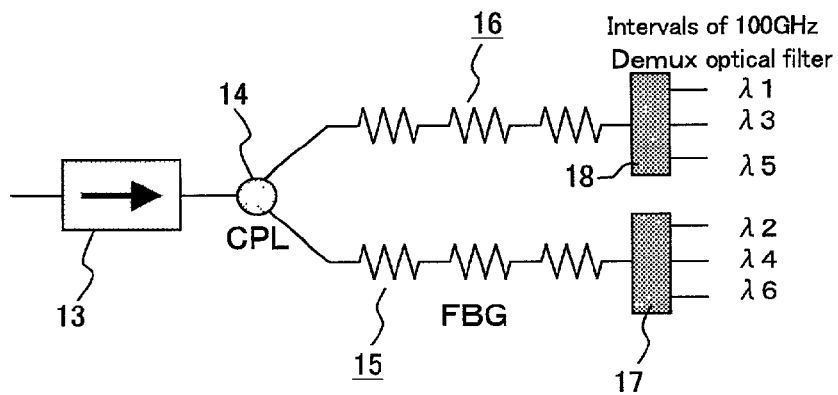
FIG. 23 shows an example of the configuration of a DMUX filter as shown in FIG. 22.
Figure 24:
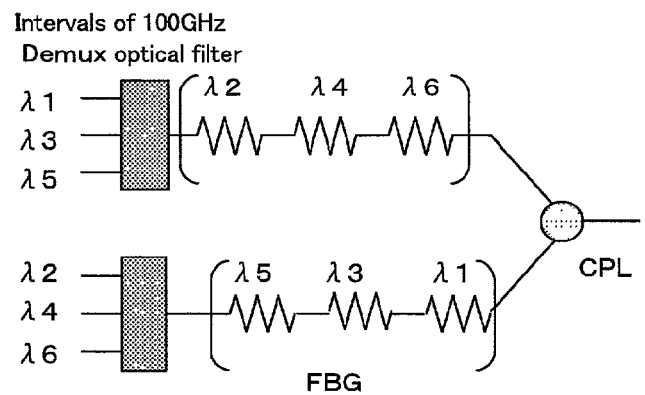
FIG. 24 shows an example of the configuration of a MUX filter as shown in FIG. 22.
Figure 27:
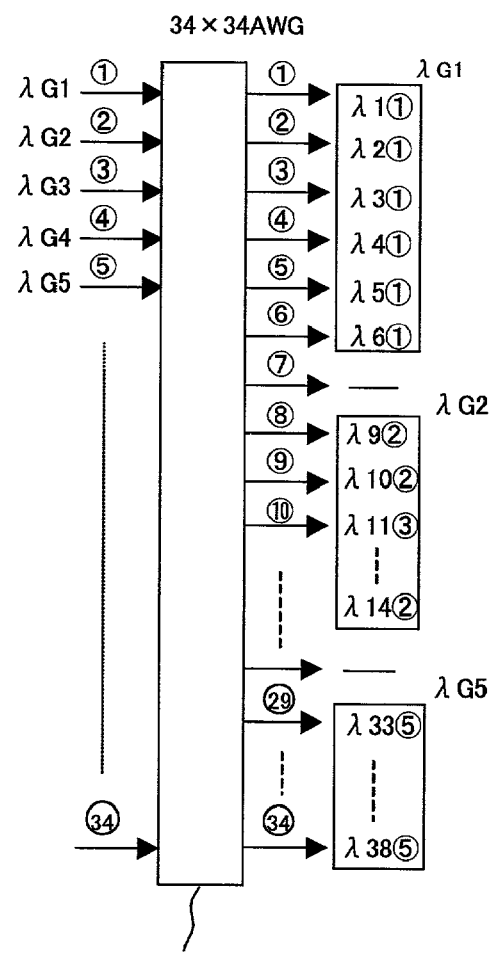
FIG. 27 shows an example of the configuration of a DMUX filter with the use of the AWG (Arrayed Waveguide Grating) device.

FIGS. 23 and 24 each a configuration example of the DMUX filters 5 and 8, or the MUX filters 6 and 7, both shown in FIG. 27, and these configuration examples are in the case where each wavelength-to-wavelength spacing is as narrow as 50 GHz, and signal rate is 10 Gb/s.

When the signal rate is high, the requirement for the band flatness characteristic within the signal wavelength becomes stringent, while, when each wavelength-to-wavelength spacing becomes narrow, flatness will be hard to secure. Also, on the dielectric multilayer film filter, separation of signals lined up at intervals of 50 GHz will be difficult because of the difficult availability of filters having steep cutoff characteristic.

In the configuration shown in FIG. 23, after branching off the optical signals coming through the isolator 13, into two with the optical coupler 14, on one path, locate the fiber grating 15, whose rejection wavelength corresponds to the wavelength of odd numbered channels, and on the other path, locate the fiber grating 16 whose rejection wavelength corresponds to the wavelength of even numbered channels.

Due to the fiber gratings 15 and 16, the spacing of the input signals to the multistage connected dielectric multilayer film filters 17 and 18 will be extended to 10 GHz. Therefore, on the dielectric multilayer film filters 17 and 18, the separation of the even numbered wavelength signals 2, 4 and 6, or odd numbered wavelength signals 1, 3 and 5 will become easier.

As the synthesizing process on the MUX filters 6 and 7 shown in FIG. 24 may be the reverse order of the process shown in FIG. 23, further detailed explanation of this processing is omitted here.

Seventh Embodiment

Figure 25:
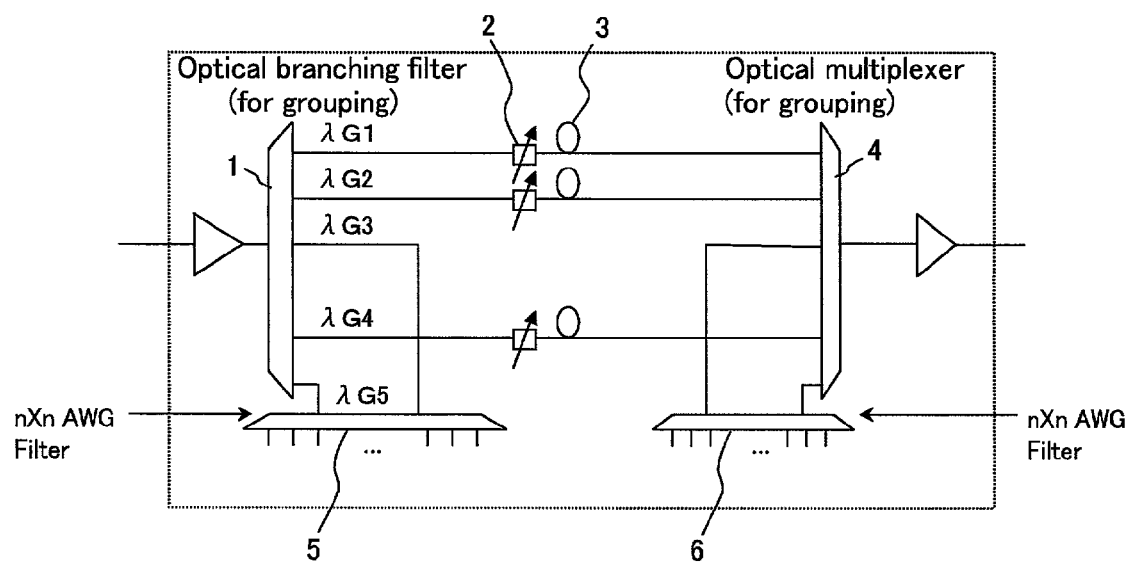
FIG. 25 shows an embodiment to configure a DMUX/MUX filter with the use of an AWG (Arrayed Waveguide Grating) device, as a variant of the embodiment shown in FIG. 22.

FIG. 25 shows an example of constructing the DMUX filter 5 and MUX filter 6 with the AWG (Arrayed Waveguide Grating) device, as a variation of the example of embodiment shown in FIG. 22.

With the use of the AWG device having (n×n) circulating property, only one AWG device can made separation for all wavelengths.

Detailed description of such an AWG device can be found in the following papers.

Figure 26:
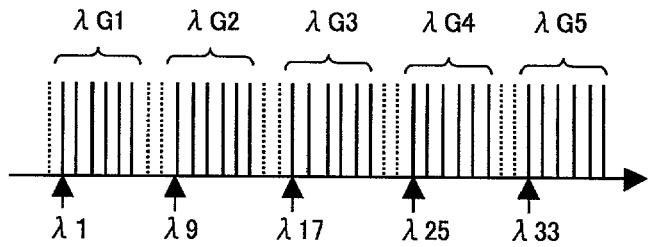
FIG. 26 shows an example of a wavelength layout to explain the characteristic of the AWG (Arrayed Waveguide Grating) device.

OplusE No. 216, p. 119–126 "Optical Wave Synthesizing/Separating Parts for Wavelength Multiplexing" Katsunori Okamoto; IEEE Photonics Technology Letters, Vol. 3, No. 9, September, C. Dragone "An N×N Optical Multiplexer using a planar arrangement of two star coupler". Now, assume that the number of wavelengths would be 1 through 38, and like the wavelength layout shown in FIG. 26, the wavelengths 1 through 38 would be separated into five wavelength groups, G1 through G5.

As shown in FIG. 27, a DMUX filter 5 is comprised of an AWG filter 20 having an input/output port 34×34, and the signals separated for each group are input to the applicable input ports (1) through (5).

In response to this, the signal wavelength of each group will be outputted in turn, with one port spaced at every group-to-group. In other words, in FIG. 27, the signal lights 1 through 6 of the wavelength group G1 to be inputted to the first input port (1) will be separated, and outputted in turn to the output ports (1) through (6). Moreover, the signal lights 9 through 14 of the wavelength group G2 to be inputted to the second input port (2) will be separated, and outputted in turn to the 8th output port through the 13th output port, jumping one output port (7). Similarly, the signal lights 33 through 38 of the wavelength group G5 to be inputted to the 5th input port (5) will be separated, and outputted to the 29th output port through the 34th output port.

As explained above, according to this invention, a further severer wave synthesizing/separation characteristic can be realized, compared with the characteristic in the past, and as a grouping filter characteristic, it is also possible to improve the relation of the number of wavelengths that can be used per one wavelength group and the number of the dead wavelengths to more than (6, 2), in other words, to improve the band use efficiency to 75% or more, thereby enabling the number of supporting wavelengths to increase. Due to these merits, it will be possible to supply a super long distance transmission system, which reduces costs per channel.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An optical device comprising:
   a branching filter which separates wavelength division multiplexed signal lights, into first and second groups, each group comprising of a plurality of wavelength groups which do not neighbor the wavelength groups, belonging to the other group on the wavelength axis;
   a functional circuit that functionally processes the wavelength groups on a wavelength group-by-group basis of the separated first and second groups; and
   a multiplexer connected to the branching filter through the functional circuit, for synthesizing the separated first and second groups.

2. The optical device according to claim 1, wherein the functional circuit makes level adjustment and dispersion compensation for each plurality of wavelength groups.

3. The optical device according to claim 1, wherein the plurality of wavelength groups each have optical signals of a plurality of different wavelengths, and the plurality of wavelength groups being placed on the wavelength axis with a space for a plurality of wavelengths of the optical signals at every wavelength group-to-wavelength group.

4. A wavelength division multiplexing communication system having a compensation node in the middle of the transmission path optical fiber to transmit wavelength division multiplexed optical signals, wherein
   the compensation node comprises an optical device, the optical device having an optical branching filter to separate the wavelength division multiplexed signal lights on a wavelength group-by-group basis, having a function unit to make level adjustment and wavelength dispersion compensation for the optical signals of wavelength groups to be separated by the optical branching filter, and having an optical multiplexer to synthesize the signal lights that have been level adjusted and dispersion compensated by the function unit and separated on a wavelength group-by-group basis, and wherein
   the optical branching filter includes a first branching filter to sequentially separate the wavelength division multiplexed signal lights of a plurality of the even numbered or odd numbered wavelength groups, each wavelength group comprising of a plurality of wavelength signals on a wavelength group-by-group basis, and a second branching filter to sequentially separate the wavelength division multiplexed signal lights of a plurality of the odd numbered or even numbered wavelength groups, each wavelength group comprising of a plurality of wavelength signals, after the separation by the first branching filter, on a wavelength group-by-group basis, wherein each group comprising of a plurality of wavelength groups which do not neighbor the wavelength groups, belonging to the other group on the wavelength axis, and wherein
   the optical multiplexer includes a first multiplexer to sequentially synthesize the signal lights of the odd numbered or even numbered wavelength groups separated by the first branching filter, and a second multiplexer to sequentially combine the signal lights synthesized by the first multiplexer with the signal lights of the even numbered or odd numbered wavelength groups separated by the first branching filter.

5. An optical device comprising:
   a first branching filter receiving a WDM signal comprising a plurality of even numbered and a plurality of odd numbered groups of wavelength signals multiplexed together and sequentially separating the wavelength division multiplexed signal lights of the plurality of even numbered or the plurality of odd numbered wavelength groups from the WDM signal;
   a second branching filter to sequentially separate the wavelength division multiplexed signal lights of the plurality of the even numbered or the plurality of odd numbered wavelength groups, which remain after the separation by the first branching filter,
   wherein each group comprising of a plurality of wavelength groups which do not neighbor the wavelength groups, belonging to the other group on the wavelength axis;
   a first multiplexer to sequentially synthesize the signal lights of the wavelength groups separated by the second branching filter; and
   a second multiplexer to sequentially synthesize the signal lights of the wavelength groups separated by the first branching filter.

6. An optical device having an optical branching filter to separate the wavelength division multiplexed signal lights on a wavelength group-by-group basis, and an optical multiplexer functionally connected to the branching filter, for synthesizing the signal lights which have been separated on a wavelength group-by-group basis, wherein
   the optical branching filter comprises:
   a first branching filter that separates signal lights into first wavelength groups and second wavelength groups consisting of the wavelength groups that do not come into contact with the wavelength groups that form the first wavelength groups, wherein each group comprising of a plurality of wavelength groups which do not neighbor the wavelength groups, belonging to the other group on the wavelength axis;
   a second branching filter that separates each of the separated first and second wavelength groups Into signal lights having a plurality of different wavelengths included in the wavelength groups that make up each wavelength groups, and wherein
   the optical multiplexer comprises;
   a first multiplexer that synthesizes the signal lights separated by the second branching filter, for each of the first and second wavelength groups, sequentially into corresponding wavelength groups; and
   a second multiplexer that synthesizes sequentially the wavelength groups making up the first and second wavelength groups synthesized by the first multiplexer.

7. The optical device according to claim 6, wherein
   the first branching filter and the second multiplexer are each formed from a plurality of circulator circuits that are connected in series, each having a fiber grating and a circulator to be provided so as to match individual wavelength groups, and wherein
   the second branching filter and the first multiplexer are each formed from a plurality of dielectric multilayer film filters that are connected in series and provided so as to match the individual wavelength groups.

8. An optical device having an optical branching filter to separate the wavelength division multiplexed signal lights on a wavelength group-by-group basis, and an optical multiplexer functionally connected to the branching filter, for synthesizing the signal lights which have been separated on a wavelength group-by-group basis, wherein the optical branching filter comprises:

a first branching filter that sequentially separates the wavelength division multiplexed signal lights of even numbered or odd numbered wavelength groups on a wavelength group-by-group basis; and a second branching filter that sequentially separates the wavelength division multiplexed signal lights of the odd numbered or even numbered wavelength groups corresponding to the remaining signal lights of the signal lights separated by the first branching filter, on a wavelength group-by-group basis, wherein each group comprising of a plurality of wavelength groups which do not neighbor the wavelength groups, belonging to the other group on the wavelength axis, and wherein the optical multiplexer comprises:

a first multiplexer that sequentially synthesizes the signal lights of the odd numbered or even numbered wavelength groups separated by the second branching filter; and a second multiplexer that sequentially synthesizes the signal lights of the even numbered or odd numbered wavelength groups separated by the first branching filter.

9. The optical device according to clam 8, wherein the first branching filter and the second multiplexer are each formed from a plurality of circulator circuits that are connected in series, each having a fiber grating and a circulator to be provided so as to match individual wavelength groups, and wherein the second branching filter and the first multiplexer are each formed from a plurality of dielectric multilayer film filters that are connected in series and provided so as to match the individual wavelength groups.

10. The optical device according to claim 8, wherein the number of wavelengths included in the individual even numbered or odd numbered wavelength groups to be separated by the first branching filter is less than the number of wavelengths included in the respective odd numbered or even numbered wavelength groups.

11. An optical device having an optical branching filter to separate the wavelength division multiplexed signal lights on a wavelength group-by-group basis, and an optical multiplexer functionally connected to the branching filter, for synthesizing the signal lights which have been separated on a wavelength group-by-group basis, wherein the optical branching filter comprises:

a first branching filter that separates signal lights into the wavelength division multiplexed signal lights of the odd numbered wavelength groups and the signal lights of the even numbered wavelength groups; and a second branching filter that separates the signal lights of the odd numbered and even numbered wavelength groups separated by the first branching filter, into respective wavelength groups, wherein each group comprising of a plurality of wavelength groups which do not neighbor the wavelength groups, belonging to the other group on the wavelength axis, and wherein the optical multiplexer comprises:

a first multiplexer that synthesizes the signal lights separated into the respective wavelength groups by the second branching filter, into the even numbered wavelength groups and the odd numbered wavelength groups, respectively; and a second multiplexer that synthesizes the signal lights of the even numbered wavelength groups and the signal lights of the odd numbered wavelength groups synthesized by the first multiplexer.

12. The optical device according to claim 11, wherein the first branching filter and the second multiplexer are formed from interleaver filters, and wherein the second branching filter and the first multiplexer are formed from a plurality of dielectric multilayer film filters that are connected in series and provided so as to match the individual wavelength groups.

13. The optical device according to claim 12, wherein the interleaver filter comprises a multistage connection of Mach-Zehnder type filters.

14. An optical device having an optical branching filter to separate the wavelength division multiplexed signal lights into groups on a wavelength group-by-group basis, wherein each group comprising of a plurality of wavelength groups which do not neighbor the wavelength group, belonging to the other group on the wavelength axis, and an optical multiplexer functionally connected to the branching filter, for synthesizing the signal lights which have been separated on a wavelength group-by-group basis, wherein the optical branching filter comprises:

an optical isolator;

an optical coupler that branches into two the signal lights that have been wavelength multiplexed through the optical isolator, a first fiber grating connected to one output of the optical coupler, for blocking the even numbered wavelength groups of the wavelength division multiplexed signal lights;

a second fiber grating connected to the other output of the optical coupler, for blocking the odd numbered wavelength groups of the wavelength division multiplexed signal lights;

a first separating filter that separates the signal lights of the odd numbered wavelength groups outputted from the first fiber grating to respective wavelength groups; and a second separating filter that separates the signal lights of the even numbered wavelength groups outputted from the second fiber grating.

15. The optical device according to claim 14, wherein the first separating filter and the second separating filter are each formed from a series connection of a plurality of dielectric multilayer film filters.

16. An optical device comprising:

a first branching filter to input wavelength division multiplexed signal lights and separate the signal lights into a first wavelength, band and other wavelength bands;

a second branching filter to input lights separated into the other wavelength bands by the first branching filter, and separate the lights into a second wavelength band different from the first wavelength band and other wavelength bands that do not come into contact with wavelength groups that form the first wavelength band, and wherein each group comprising of a plurality of wavelength groups which do not neighbor the wavelength groups, belonging to the other group on the wavelength axis; and a second wavelength device to input the lights of the second wavelength band extracted by the second branching filter, the second wavelength device outputting at least the second wavelength band to the first multiplexer, wherein the first multiplexer synthesizes lights separated into the first wavelength band by the first branching filter and the lights from the second multiplexer and outputs the synthesized lights.

17. The optical device according to claim 16, further comprising:
a third branching filter to separate lights, at least, into a wavelength band lying between the first and second wavelength bands and other bands; and
a third multiplexer to input the lights of the wavelength band lying between the first and second wavelength bands separated by the third branching filter, the third multiplexer outputting at least the lights of the wavelength band between the first and the second wavelength bands to the second multiplexer, wherein the second multiplexer synthesizes the lights of the second wavelength band from the second branching filter and the lights from the third multiplexer, and outputs the synthesized lights to the first multiplexer.

18. An optical device comprising:
means for receiving a WDM signal comprising a plurality of even numbered and a plurality of odd numbered groups of wavelength signals multiplexed together and sequentially separating the wavelength division multiplexed signal lights of the plurality of even numbered or the plurality of odd numbered wavelength groups from the WDM signal;
means for sequentially separating the remaining wavelength division multiplexed signal lights of the plurality of the even numbered or the plurality of odd numbered wavelength groups,
wherein each group comprising a plurality of wavelength groups which do not neighbor the wavelength groups, belonging to the other group on the wavelength axis;
means for sequentially synthesizing the remaining signal lights of the wavelength groups separated; and
means for sequentially synthesizing the signal lights of the wavelength groups initially separated from the WDM signal.

* * * * *

UNITED STATES PATENT AND TRADEMARK OFFICE
CERTIFICATE OF CORRECTION

PATENT NO. : 7,062,173 B2  Page 1 of 1
APPLICATION NO. : 09/963471
DATED : June 13, 2006
INVENTOR(S) : Hiroaki Tomofuji et al.

It is certified that error appears in the above-identified patent and that said Letters Patent is hereby corrected as shown below:

Column 18, Line 42, change "Into" to --into--.

Column 20, Line 26, after "into two" delete "the".

Column 20, Line 51, after "wavelength" delete ",".

Signed and Sealed this

Sixth Day of February, 2007

JON W. DUDAS
*Director of the United States Patent and Trademark Office*